United States Patent
Otsuka

(10) Patent No.: US 8,149,425 B2
(45) Date of Patent: Apr. 3, 2012

(54) IMAGE PROCESSING APPARATUS FOR DESIGNATING READING CONDITIONS

(75) Inventor: Masashi Otsuka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 688 days.

(21) Appl. No.: 12/318,120

(22) Filed: Dec. 22, 2008

(65) Prior Publication Data

US 2009/0168106 A1 Jul. 2, 2009

(30) Foreign Application Priority Data

Dec. 28, 2007 (JP) .................................. 2007-338767

(51) Int. Cl.
*G06F 3/12* (2006.01)
*G06K 1/00* (2006.01)
(52) U.S. Cl. ........................................ 358/1.1; 358/1.13
(58) Field of Classification Search .................. None
See application file for complete search history.

(56) References Cited

U.S. PATENT DOCUMENTS

| 7,307,743 B2 * | 12/2007 | Watanabe et al. ............. 358/1.13 |
| 7,738,133 B2 * | 6/2010 | Inakawa et al. ............... 358/1.16 |
| 2005/0286924 A1 * | 12/2005 | Kurohata et al. ................. 399/82 |
| 2006/0170948 A1 * | 8/2006 | Kobashi ........................ 358/1.13 |
| 2007/0013931 A1 * | 1/2007 | Ito ................................ 358/1.13 |
| 2007/0121151 A1 * | 5/2007 | Uchida ........................ 358/1.15 |

FOREIGN PATENT DOCUMENTS

| JP | 06-152864 A | 5/1994 |
| JP | 11-196243 A | 7/1999 |
| JP | 2006-352751 | 12/2006 |

\* cited by examiner

*Primary Examiner* — Gabriel Garcia
(74) *Attorney, Agent, or Firm* — Rabin & Berdo, P.C.

(57) ABSTRACT

An image processing apparatus includes a reading unit, a first designation unit, a first storage unit, and a reading control unit. The reading unit generates an image by reading multiple original documents. The designation unit designates a reading condition with respect to a portion of the original documents in a case of reading. The storage unit stores the reading condition, corresponding to the portion received by the designation unit, as reading condition information. The reading control unit reads the reading condition information stored in the storage unit and controls the reading unit based on the reading condition information read.

8 Claims, 11 Drawing Sheets

FIG. 7
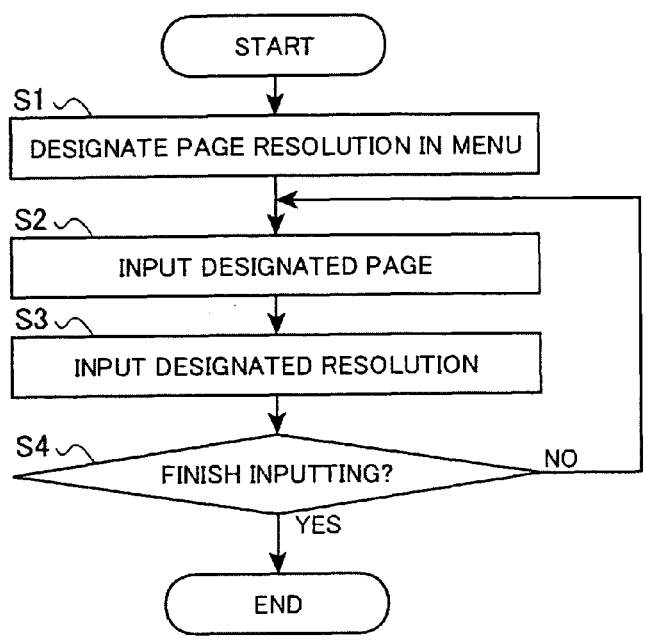
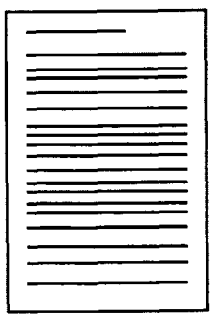
FIG. 8A
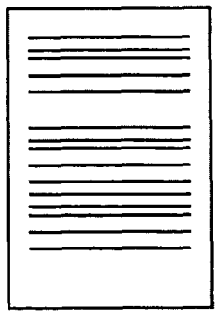
FIG. 8B
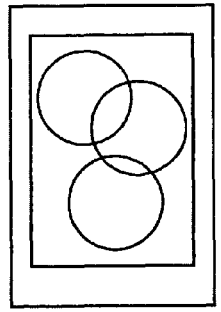
FIG. 8C
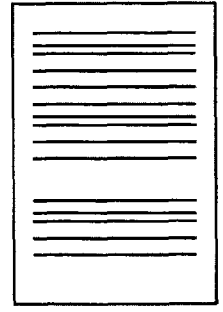
FIG. 8D

| P | dpi |
|---|---|
| 3 | 600 |
| OTHER | 300 |

FIG. 11

| P | MEMORY ADDRESS | dpi |
|---|---|---|
| 1 | 0x0000_0000 ~ 0X0000_03FF | 300 |
| 2 | 0x0000_0400 ~ 0X0000_07FF | 300 |
| 3 | 0x0000_0800 ~ 0X0000_17FF | 600 |
| 4 | 0x0000_1800 ~ 0X0000_1BFF | 300 |

FIG. 13A

PAGE RESOLUTION DESIGNATION
HISTORY MENU

1/3

HISTORY No.1 20XX,01,01

| DESIGNATED PAGE P | DESIGNATED RESOLUTION dpi |
|---|---|
| 3 | 600 |
|  |  |
|  |  |

→ PREVIOUS  NEXT

FIG. 13B

PAGE RESOLUTION DESIGNATION
HISTORY MENU

2/3

→ HISTORY No.2 20XX,02,01

| DESIGNATED PAGE P | DESIGNATED RESOLUTION dpi |
|---|---|
| 2,4 | 600 |
|  |  |
|  |  |

PREVIOUS  NEXT

IMAGE PROCESSING APPARATUS FOR DESIGNATING READING CONDITIONS

BACKGROUND OF THE INVENTION

1. Field of the Invention

The present invention relates to an image processing apparatus.

2. Description of Related Art

A prior art image processing apparatus having a reading unit for reading an image formed on an original document includes an automatic color selection (ACS) function. The ACS function distinguishes whether the image read by the reading unit is a multi-color image or a monochrome image.

Japanese Un-examined Patent Application Publication No. 2006-352751 discloses an image forming apparatus, an image forming method, a program, and a recording medium for reading an image by modification of reading resolution with respect to each multi-color or monochrome image based on a distinction provided by the ACS function.

The image forming apparatus disclosed in the above document reads the multi-color or monochrome image based the reading resolution designated by an operator beforehand. Moreover, the image forming apparatus disclosed in the above publication executes a reading operation on the image according to the higher reading resolution as between the designated reading resolution of the multi-color image and the designated reading resolution of the monochrome image.

Here, assuming that the reading resolution is designated by the operator, the reading resolution of the multi-color image is higher than that of the monochrome image. In a case where the ACS function determines that a target image to be read is the multi-color image, the image forming apparatus disclosed in the above document applies the reading resolution of the multi-color image with respect to all of the original documents. Consequently, the image forming apparatus disclosed in the above document applies the reading resolution of the multi-color image even to the monochrome image.

Such application of the reading resolution of the multi-color image to the monochrome image causes some problems. For example, the application of high reading resolution to the monochrome image increases the volume of data of the monochrome image since the monochrome image is normally read by application of a low reading resolution. Such an increased data volume of the monochrome image may cause a reduction in the memory of the image forming apparatus. Moreover, since the monochrome image is read with high resolution, the image forming apparatus consumes a longer time period to read a monochrome image than a time period consumed to read a monochrome image with low resolution.

The present invention provides an image processing apparatus capable of reading a multi-color image or a monochrome image with appropriate reading resolution by modifying the reading resolution designated by an operator with respect to each page.

BRIEF SUMMARY OF THE INVENTION

According to one aspect of the invention, an image processing apparatus includes: a reading unit generating an image by reading a plurality of original documents; a first designation unit designating a reading condition with respect to a portion of the plurality of original documents in a case of reading; a first storage unit storing the reading condition, corresponding to the portion received by the first designation unit, as reading condition information; and a reading control unit reading the reading condition information stored in the first storage unit and controlling the reading unit based on the reading condition information read.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein:

FIG. 7 is a flowchart illustrating an exemplary procedure for designation operation in a case where the reading resolution is designated;

FIGS. 8A through 8D are schematic diagrams illustrating examples of documents;

FIG. 11 is a schematic diagram illustrating an example of image data stored in a memory;

FIGS. 13A and 13B are schematic diagrams illustrating other examples of display screens of the display unit according to the second embodiment of the present invention.

DETAILED DESCRIPTION OF PREFERRED EMBODIMENTS

Figure 1:
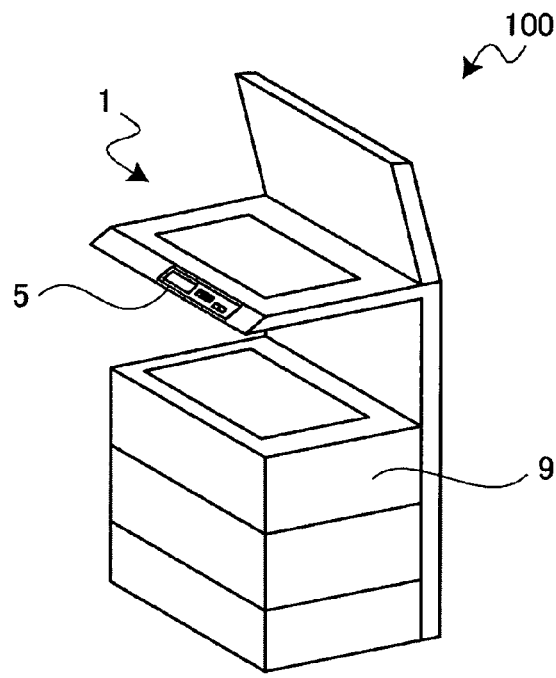
FIG. 1 is an external view illustrating a multi-functional peripheral (MFP) serving as an image processing apparatus according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, like reference numerals designate identical or corresponding parts throughout the several views. An image processing apparatus according to the present invention is described with reference to the drawings. In an embodiment of the present invention, a multi-functional peripheral (hereafter referred to as MFP) serving as an image processing apparatus is described as an example.

First Embodiment

Referring to FIG. 1, an MFP 100 is illustrated in an external view. The MFP 100 is a multi-functional apparatus integrating a scanner 1 reading an image on an original document, an operation unit 5 receiving designation of reading resolution and the like provided by an operator, and a printer 9 printing the image read by the scanner 1 on a sheet.

The MFP 100 performs copy operation by coordinating operation of the scanner 1 and the printer 9. In the copy operation by the MFP 100, the operator places an original document 19 to be copied on the scanner 1 and inputs designation information of the reading resolution, etc. through the operation unit 5. Alternatively, the operator inputs the designation information of the reading resolution, etc. through the operation unit 5 and places the original document 19 to be copied on the scanner 1. Next, the scanner 1 reads the image on the original document 19 based on an instruction of the operation unit 5, which has received the designation of the reading resolution and the like. Subsequently, the printer 9 prints the image on the sheet based on image data read by the scanner 1, so that the MFP 100 completes the copy operation.

The scanner 1 of the MFP 100 is described below with reference to FIG. 2 and FIG. 3.

Figure 2:
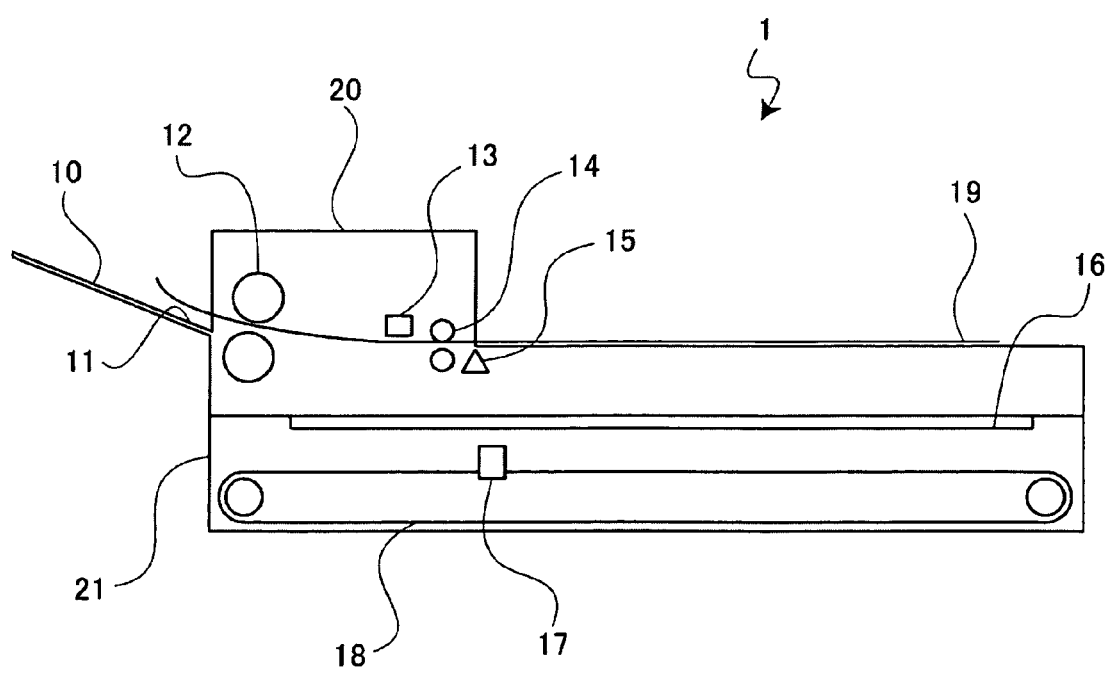
FIG. 2 is a cross-sectional side view illustrating a side of a scanner.

Referring to FIG. 2, the scanner 1 is illustrated in a cross-sectional side view. The scanner 1 includes a sheet tray 10 placing the original document 19 thereon, an automatic document feeder (ADF) unit 20 serving as a reader 2 reading the image on the original document 19 and conveying the original document 19, and a flat bed (FB) unit 21 serving as another reader 2 reading the image on the original document 19 stacked on an original document table 16.

The ADF unit 20 separately conveys original documents 19 having plural pages page by page. The ADF unit 20 includes a remaining sheet sensor 11 detecting a number of sheets of the original documents 19 remained on the sheet tray 10, a pick-up roller 12 bringing the original document 19 into the ADF unit 20, a reading unit 13 for ADF reading the image on the original document 19 brought by the pick-up roller 12, an ejection roller 14 ejecting the original document 19 to the outside the ADF unit 20, and a sheet position sensor 15 detecting a tailing end position of the original document 19 ejected by the ejection roller 14.

The remaining sheet sensor 11 detects the remaining sheet number of the original document 19 stacked on the sheet tray 10. Upon detecting the original document 19, the remaining sheet sensor 11 notifies a scanning main controller 4 of the remains of the original document 19. Upon receiving the notification from the remaining sheet sensor 11, the scanning main controller 4 supplies an instruction to a drive motor (not shown) so as to drive the pick-up roller 12 and the ejection roller 14. The drive motor transmits drive force, so that the pick-up roller 12 begins to rotate and brings the original document 19 into the ADF unit 20.

The reading unit 13 for ADF includes a light source (not shown), a charge coupled device (CCD) image sensor, and a lens. The light source emits light that is reflected from the original document 19. The CCD sensor measures the amount of the light reflected from the original document 19, thereby reading the image on the original document 19. The reading unit 13 for ADF reads the image on the original document 19 brought into the ADF unit 20 by the pick-up roller 12. Subsequently, the original document 19 on which the image is read is ejected to the outside of the ADF unit 20 by the ejection roller 14. When the sheet position sensor 15 detects the tailing end of the original document 19, the pick-up roller 12 begins to bring a next sheet into the ADF unit 20.

The FB unit 21, on the other hand, includes the original document table 16 stacking the original document 19 thereon, a reading unit 17 for FB reading the image on the original document 19, and a conveyance unit 18 for FB conveying the reading unit 17 for FB in a sub-scanning direction with respect to the original document 19.

Similar to the reading unit 13 for ADF, the reading unit 17 for FB includes a light source (not shown), a CCD image sensor, and a lens. The light source emits a light that is reflected from the original document 19. The CCD sensor measures the amount of light reflected from the original document 19, thereby reading the image on the original document 19. The reading unit 17 for FB moves in the sub-scanning direction with respect to the original document 19 by drive of the conveyance unit 18 for FB. The reading unit 17 for FB reads the image on the original document 19 while moving in the sub-scanning direction with respect to the original document 19.

Figure 3:
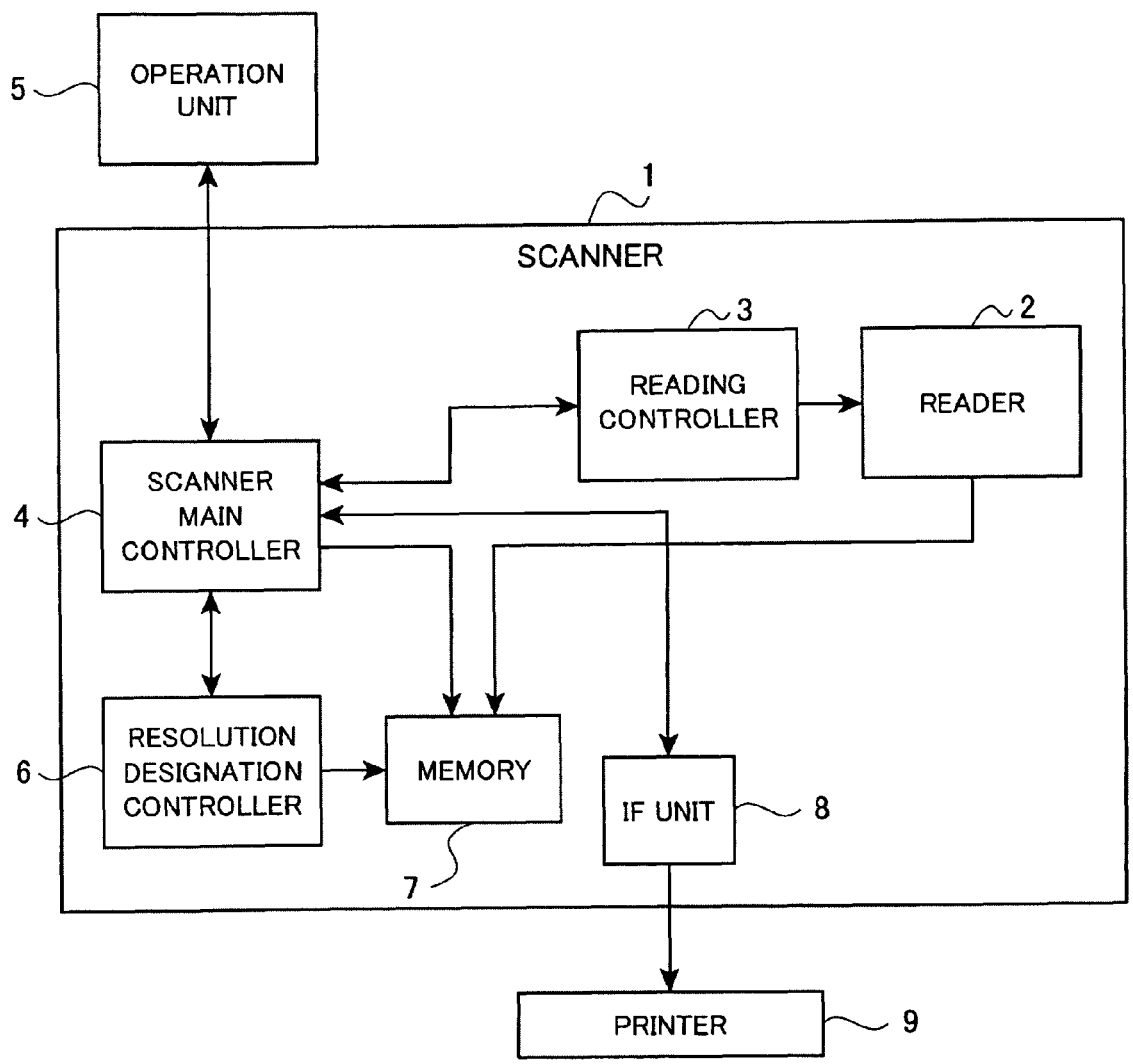
FIG. 3 is a block diagram illustrating essential elements of the scanner.

Referring to FIG. 3, essential elements of the scanner 1 are illustrated in a block diagram. The scanner 1 includes the reader 2 reading the image on the original document 19, a reading controller 3 controlling the reader 2, the scanning main controller 4 controlling the reading controller 3 and the scanner 1 as a whole, a resolution designation controller 6 reading the reading resolution information of each page stored in a memory 7 and supplying the reading resolution information to the scanning main controller 4, the memory 7 storing the image data based on the image read by the reader 2 and the resolution information of each page, and an interface (IF) unit 8 serving as an interface with the printer 9.

The reader 2 corresponds to the reading unit 13 for ADF and the reading unit 17 for FB, and reads the image on the original document 19 based on designated reading resolution.

In a case where the image is read at the reading resolution applied to the multi-color image (i.e., the image is read at high resolution), the reading resolution designated by the operator is directly applied. On the other hand, in a case where the image is read at the reading resolution applied to the monochrome image (i.e., the image is read at low resolution), the reader 2 reads odd numbered pixels or even numbered pixels in a main scanning direction of the original document 19, or reads every other reading line in the sub-scanning direction of the original document 19. Such thinned-out operation of the reading pixel allows the reader 2 to read the image at the low resolution.

The reading controller 3 controls the reader 2 with respect to each page based on the reading resolution designated by the scanner main controller 4.

The scanning main controller 4 receives designation information of the reading resolution and the like received by the operation unit 5, and stores the designation information in the memory 7 as reading resolution information. The scanning main controller 4 supplies an instruction with respect to the resolution designation controller 6 to read the reading resolution information stored in the memory 7, and controls the reading controller 3 based on the reading resolution information read by the resolution designation controller 6. Moreover, the scanning main controller 4 cause the image read by the reader 2 in the memory 7 to be stored as image data. In a case where the printer 9 prints the image on a sheet, the scanning main controller 4 supplies the instruction to the IF unit 8 to transmit the image data.

The resolution designation controller 6 reads the reading resolution information stored in the memory 7 based on the instruction of the scanning main controller 4. The reading resolution information read by the resolution designation controller 6 is transmitted to the scanning main controller 4.

The memory 7 includes a nonvolatile memory such as a flash memory, an ultra-violet erasable programmable read only memory (UV-ERPOM), or an electronically erasable and programmable read only memory (EEPROM), and stores the image data based on the image read by the reader 2 and the reading resolution information.

The IF unit 8 serves as the interface between the scanning main controller 4 and the printer 9. The IF unit 8 transmits the image data to the printer 9 according to the instruction from the scanning main controller 4. The image data transmitted to the printer 9 are converted into print data and are printed on the sheet.

According to the above-described structure, the scanner 1 can read the image on the original document 19 based on the designation information of the reading resolution and the like designated by the operator through the operation unit 5. Moreover, the image read by the scanner 1 is transmitted as image data to the printer 9. Upon receiving the image data, the printer 9 prints the image on the sheet based on the image data.

Next, the operation unit 5 is described. The operation unit 5 receives the designation of the reading resolution and the like provided by the operator and transmits the received designation information to the scanning main controller 4.

Figure 4:
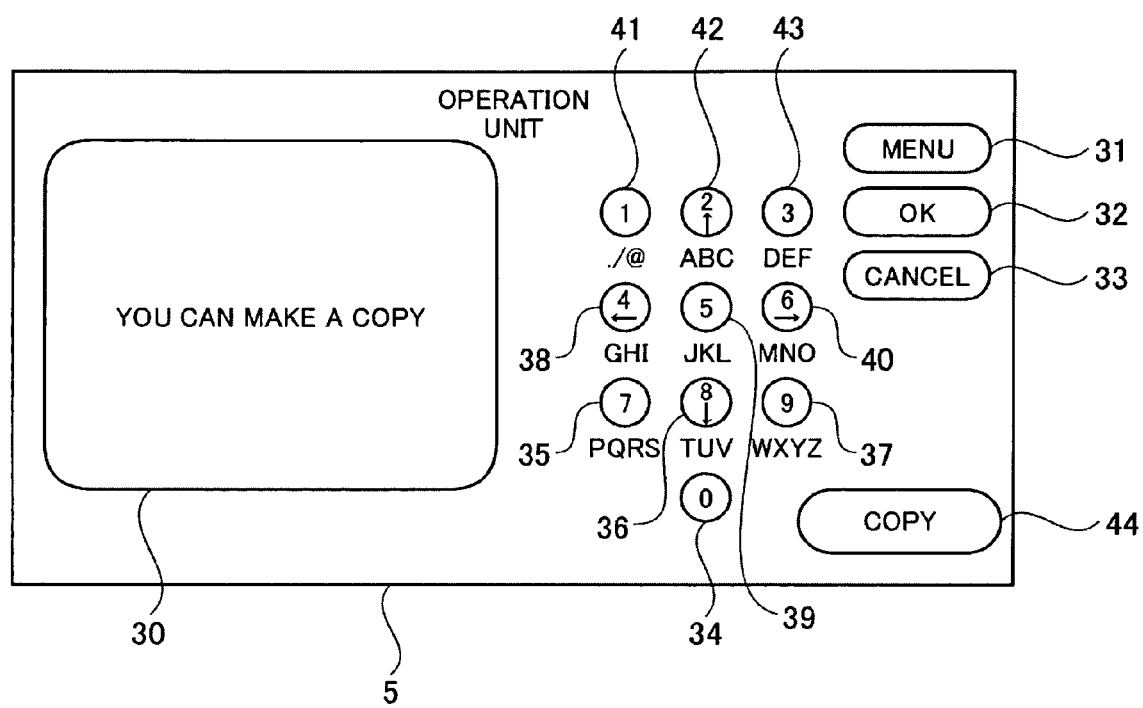
FIG. 4 is a schematic diagram illustrating an example of an operation unit receiving designation of reading resolution provided by an operator.

Referring to FIG. 4, an exemplary structure of the operation unit 5 receiving the designation of the reading resolution provided by the operator is illustrated. The operation unit 5 includes a display unit 30 including a liquid crystal display or a light emitting diode (LED) display displaying various designation items to be designated by the operator or the designation information designated by the operator, an operation button 31 receiving a change of menu or various modes by the operator, an operation button 32 receiving a decision of the designation made by the operator, an operation button 33 receiving a cancelation of the designation by the operator, operation buttons 34 through 43 receiving an input of a numeral, a letter of the alphabet, or a symbol, and an operation button 44 receiving an execution designation of the copy. Each of the operation buttons 36, 38, 40, and 42 responds to a cursor movement to be displayed on the display unit 30.

In a case where the operator designates the reading resolution by using the operation buttons, the operation unit 5 displays a screen on the display unit 30. Examples of screens displayed on the display unit 30 by the operation unit 5 are illustrated in FIGS. 5A, 5B, 5C, 6A, and 6B.

Figure 5A:
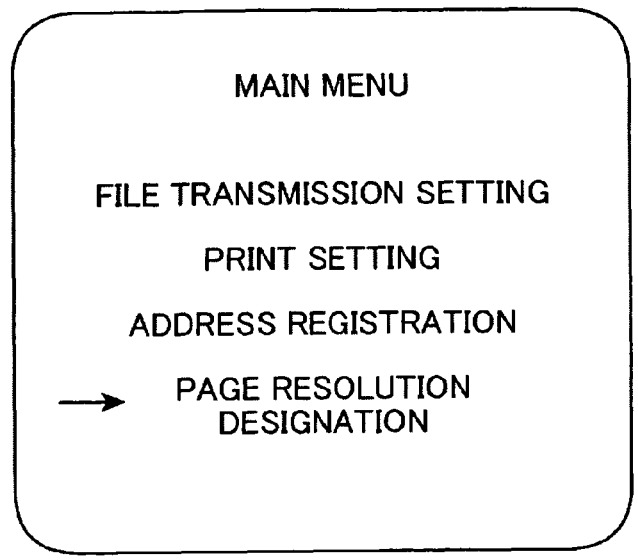
FIGS. 5A through 5C are schematic diagrams illustrating examples of display screens of display unit according to the first embodiment of the present invention.

FIG. 5A illustrates an example of a display screen during a standby period of the MFP 100. As illustrated in FIG. 5A, the display screen includes the items of "FILE TRANSMISSION SETTING," "PRINT SETTING," "ADDRESS REGISTRATION," and "PAGE RESOLUTION DESIGNATION." The operator selects the item "FILE TRANSMISSION SETTING" in a case of transmitting electric mail with an attachment of the image data based on the image read by the reading unit 13 for ADF.

The operator selects the item "PRINT SETTING" in a case of printing the image data on a prescribed sheet based on the image read by the reading unit 13 for ADF.

The operator selects the item "ADDRESS REGISTRATION" to register a destination address in a case of transmitting the electric mail with the attachment of the image data based on the image read by the reading unit 13 for ADF.

The operator selects the item "PAGE RESOLUTION DESIGNATION" in a case of designating the reading resolution.

Such an exemplary screen as illustrated in FIG. 5A serves as an interface, so that the operator optionally selects the items of "FILE TRANSMISSION SETTING," "PRINT SETTING," "ADDRESS REGISTRATION," and "PAGE RESOLUTION DESIGNATION" using the operation buttons 36, 38, 40, and 42. In a case where the MFP 100 is in an initial state, for example, electric power of the MFP 100 is activated, the display screen as illustrated in FIG. 5A is displayed.

Figure 5B:
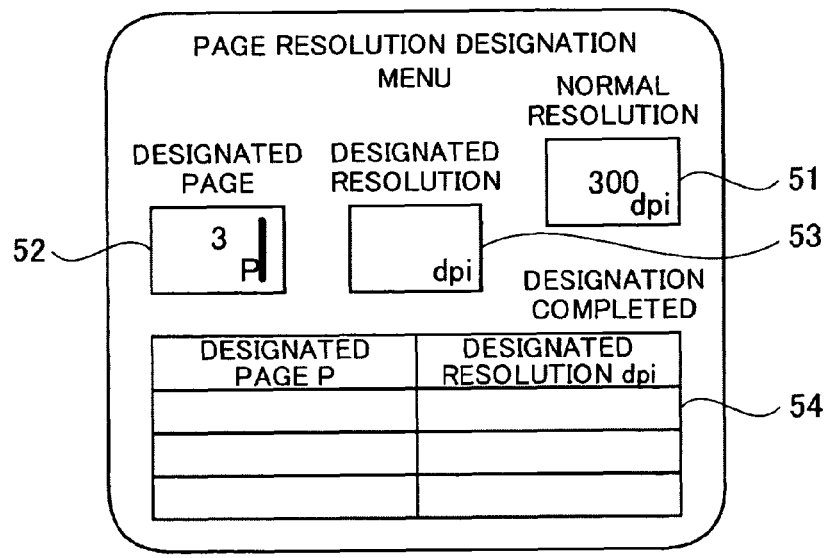

When the operator selects the "PAGE RESOLUTION DESIGNATION" in FIG. 5A by manipulation of the operation buttons 36, 38, 40, and 42, another exemplary screen illustrated in FIG. 5B is displayed. A normal resolution box 51 receives the designation of the reading resolution of a page other than the page designated by the operator. A designated page box 52 receives the designation of the page to be applied with the reading resolution designated by the operator. A designated resolution box 53 receives the designation of the reading resolution by the operator. A designation state display unit 54 displays a designation state by the operator.

Figure 5C:
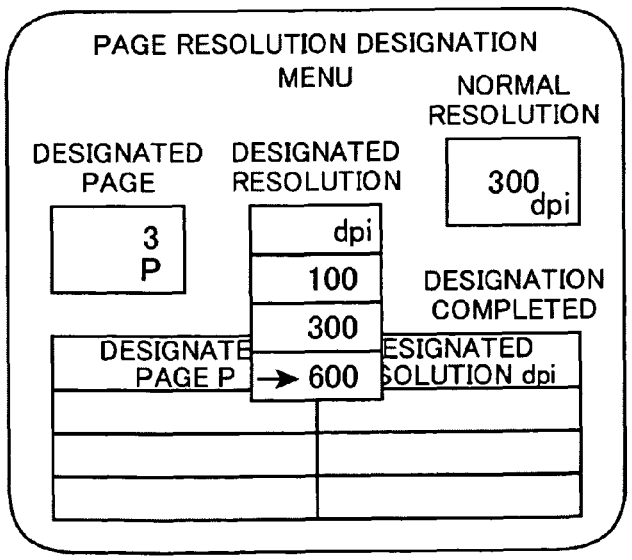

In a case where the reading resolution is designated in the designated resolution box 53, the operator selects a desired reading resolution from the reading resolutions displayed in a pull-down menu on the display screen as illustrated in FIG. 5C, for example. In the designated resolution box 53, the reading resolution executable by the reading unit 13 for ADF or the reading unit 17 for FB is displayed on the pull-down menu.

Figure 6A:
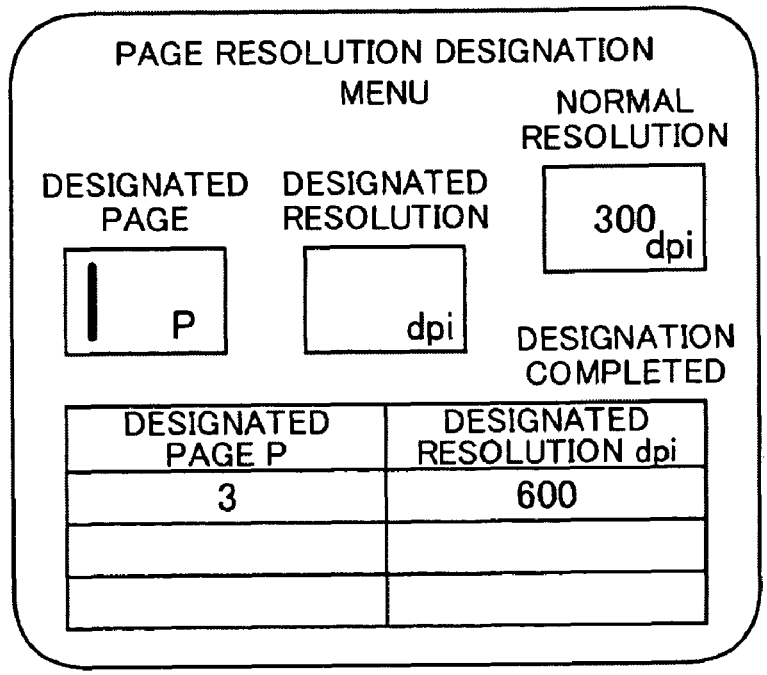
FIGS. 6A and 6B are schematic diagrams illustrating other examples of display screens of the display unit according to the first embodiment of the present invention.

When the operator inputs a designation content in the designated page box 52 and the designated resolution box 53, the designation state is displayed in the designation state display unit 54 as illustrated in FIG. 6A.

Figure 6B:
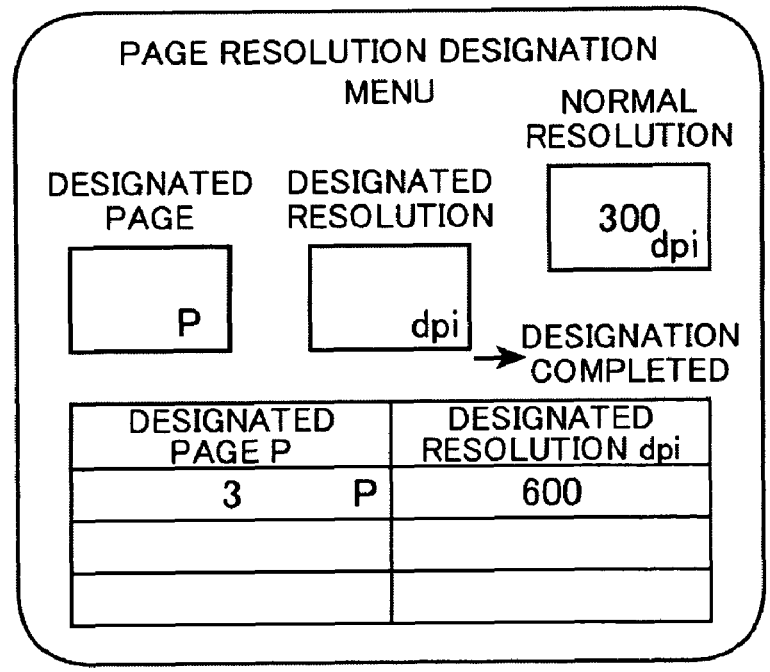

In a case where the designation of reading resolution and the like is completed, the operator places an input cursor at "DESIGNATION COMPLETED" as illustrated in FIG. 6B.

Referring to a flowchart of FIG. 7, an exemplary procedure for operating the designation in a case where the operator designates the reading resolution by using the above-described display screens is explained. In the description of the designation operation of the reading resolution by the operator, the MFP 100 is assumed to successively read a four-page document as illustrated in FIGS. 8A through 8D. For example, a first page of the four-page document is a text document as illustrated in FIG. 8A. A second page, a third page, and a fourth page of the four-page document are a text document, a photograph document, and a text document as illustrated in FIGS. 8B, 8C, and 8D, respectively. The ADF unit 20 of the MFP 100 is assumed to read the text documents of the first, second, and fourth pages as monochrome images with low resolution, and reads the photographic document of the third page as a multi-color image with high resolution.

When the operator selects the "PAGE RESOLUTION DESIGNATION" on the display screen of FIG. 5A, the display screen of FIG. 5B is displayed. Subsequently, the operator designates the reading resolution. Particularly, the operator inputs 300 dpi as normal resolution in the normal resolution box 51 using the operation buttons 34 through 43, and presses the operation button 32 (step S1). Upon receiving the designation of normal resolution, the operation unit 5 transmits the designation information of normal resolution to the scanning main controller 4. Then, the scanning main controller 4 causes the designation information of the normal resolution transmitted thereto to be stored in the memory 7. Subsequently, the scanning main controller 4 supplies the instruction with respect to the operation unit 5 to move the input cursor to the designated page box 52.

Next, the operator inputs "3" indicating the third page in the designated page box 52 using the operation buttons 34 through 43, and presses the operation button 32 (step S2). Here, in step S2, the operator inputs "3" as a page having the image to be read by the reading unit 13 for ADF by application of the reading resolution designated by the operator. Upon receiving the designation of the page, the operation unit 5 transmits the designation information of the page to the scanning main controller 4. Subsequently, the scanning main controller 4 causes the designation information of the page transmitted thereto to be stored in the memory 7. Next, the scanning main controller 4 supplies the instruction with respect to the operation unit 5 to move the input cursor to the designated resolution box 53.

Next, in the page designated in the designated page box 52, the operator designates the reading resolution to be applied by the reading unit 13 for ADF. For example, where the operator designates 600 dpi as the reading resolution, the operator selects 600 dpi from the pull-down menu and presses the operation button 32 (step S3). Upon receiving the designation of the reading resolution, the operation unit 5 transmits the designation information of the reading resolution to the scanning main controller 4. Subsequently, the scanning main controller 4 causes the designation information of the reading resolution transmitted thereto to be stored in the memory 7.

In a case where the operator continues to designate the page and the reading resolution (No in step S4), the operator repeats the process from step S2. On the other hand, in a case where the operator finishes the designation of the page and the reading resolution (Yes in step S4), the operator moves the input cursor to the "DESIGNATION COMPLETED" and presses the operation button 32. Hereupon, the scanning main controller 4 finishes displaying the screen of FIG. 6B and supplies the instruction to the operation unit 5 to display the standby screen of FIG. 5A.

Figures 9, 10:
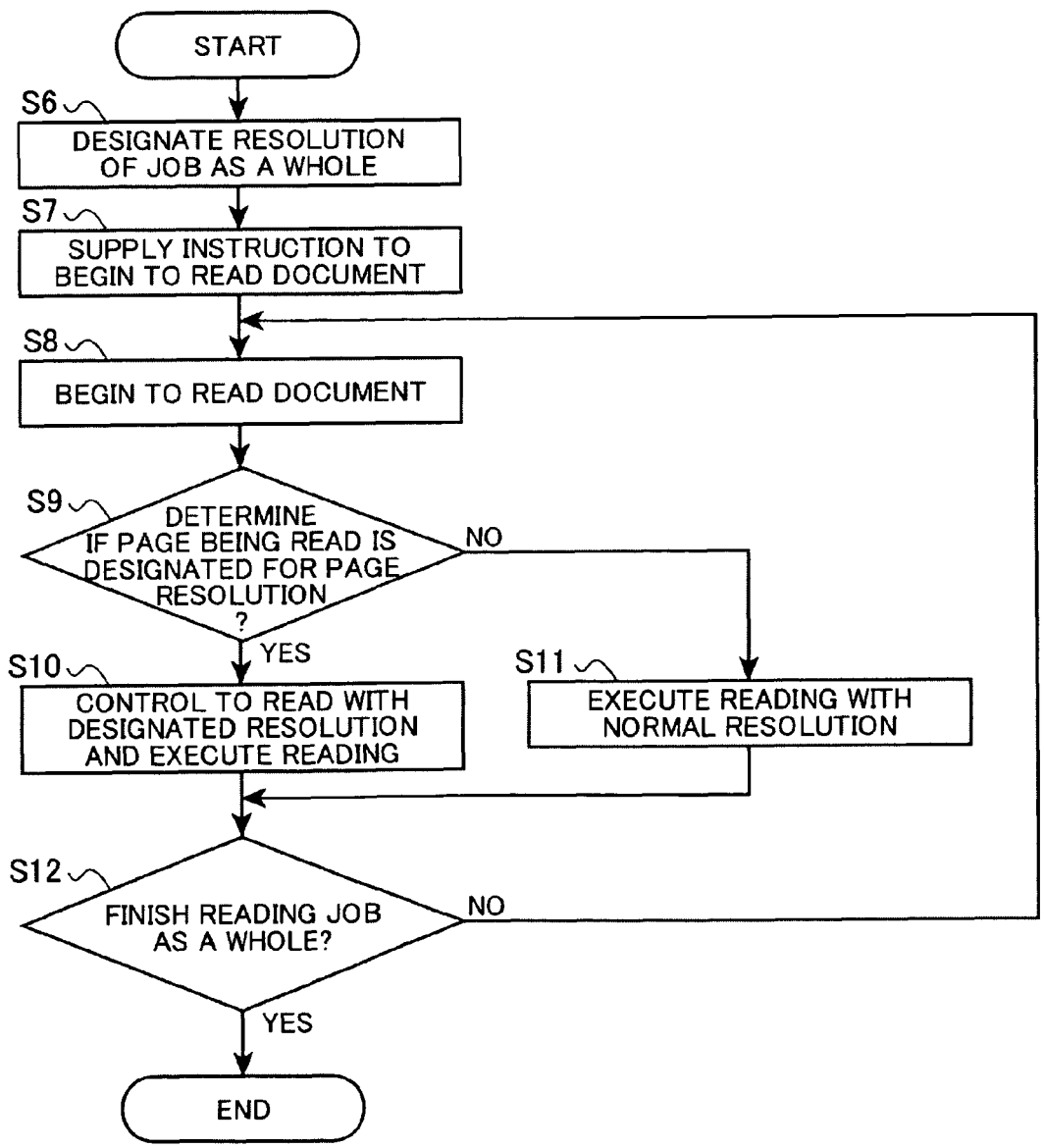
FIG. 9 is a schematic diagram illustrating an example of a file format to be stored.
FIG. 10 is a flowchart illustrating an example procedure for reading operation of the document by the MFP.

The designation information designated by the operator in the normal resolution box 51, the designated page box 52, and the designated resolution box 53 is stored as the reading resolution information in a table format in the memory 7 as illustrated in FIG. 9. Moreover, the reading resolution information is provided with a date of designation of the reading resolution as a save file name, for example, "20XX. 01. 01."

Referring to a flowchart of FIG. 10, an exemplary procedure for executing the reading operation of the document by the MFP 100 upon receiving the above-described designation operation of the reading resolution by the operator is explained.

The operator presses the operation button 44. Upon receiving a read-beginning instruction of the document by the operator, the operation unit 5 supplies the read-beginning instruction of the document to the scanning main controller 4. Upon receiving the read-beginning instruction, the scanning main controller 4 supplies the instruction with respect to the resolution designation controller 6 to read the reading resolution information stored in the memory 7. Upon receiving the reading instruction of the reading resolution information, the resolution designation controller 6 reads the designation information of the normal resolution from the reading resolution information stored in the memory 7.

The scanning main controller 4 provisionally sets the normal resolution, read from the memory 7 by the resolution designation controller 6, as the reading resolution of the reading unit 13 for ADF (step S6). In step S7, the scanning main controller 4 supplies the read-beginning instruction of the document with respect to the reading controller 3. Upon receiving the read-beginning instruction of the document, the reading controller 3 controls the reading unit 13 for ADF. Subsequently, the reading unit 13 for ADF begins to read the document (step S8).

Simultaneously, the scanning main controller 4 refers to designation information of the page and the reading resolution in the reading resolution information read from the memory 7 by the resolution designation controller 6. The scanning main controller 4 refers to the designation information of the page and the reading resolution so as to determine whether or not the page currently being read by the reading unit 13 for ADF receives a designation of reading resolution different from the normal resolution (step S9).

In a case where the scanning main controller 4 determines that the page being read receives the designation of the reading resolution (Yes in step S9), the scanning main controller 4 supplies the instruction with respect to the reading controller 3 to read the page based on the designation information of the reading resolution. The reading controller 3 controls the reading unit 13 for ADF based on the designation information of the reading resolution (step S10).

On the other hand, in a case where the page being read is determined not to receive the designation of the reading resolution (No in step S9), the scanning main controller 4 supplies the instruction with respect to the reading controller 3 to read the page based on the designation information of the normal resolution. The reading controller 3 controls the reading unit 13 for ADF based on the designation information of the normal resolution (step S11).

Such processes of steps S8 through S10 or S11 are repeatedly executed until a last page of the document is provided. When the remaining sheet sensor 11 detects the last page of the document, the remaining sheet sensor 11 notifies the scanning main controller 4 of the detection of the last page of the document. The scanning main controller 4 determines that all of the pages of the document are read, thereby finishing a series of reading operations (step S12).

According to the embodiment, each of the first and second pages of the four-page document is the text document, and the reading resolution is not designated by the operator. Therefore, the reading unit 13 for ADF executes the reading operation of the first and second pages of the four-page document by application of the reading resolution of the normal resolution having 300 dpi. The third page of the four-page document is the photographic document, and the reading resolution is designated by the operator. Therefore, the reading unit 13 for ADF executes the reading operation of the third page of the four-page document by application of the reading resolution of the designated resolution having 600 dpi. Moreover, the fourth page of the four-page document is a text document, and the reading resolution is not designated by the operator. Therefore, the reading unit 13 for ADF executes the reading operation of the fourth page of the four-page document by application of the reading resolution of the normal resolution having 300 dpi.

The image read by the reading unit 13 for ADF is stored as image data in the memory 7. Such image data is stored in the memory 7 in a table format easily convertible into print image data, for example, a page number in the four-page document, an address in the memory 7, and the reading resolution and the like as illustrated in FIG. 11.

After the reading operation by the reading unit 13 for ADF is finished, the scanning main controller 4 supplies the instruction with respect to the IF unit 8 to transmit the image data in the table format stored in the memory 7 to the printer 9. Upon receiving the image data, the printer 9 converts the image data into the print image data and prints the image on the sheet.

After the reading operation by the reading unit 13 for ADF is finished, the image data in the table format stored in the memory 7 can by transmitted to a prescribed address, or the image data can be stored in a mobile memory to be carried.

Moreover, the image data read can be printed by the printer 9 serving as an image forming mechanism as illustrated in FIG. 1. In a case where such image data is printed using a normal default setting, a print condition may agree or may not agree with the reading condition at a time of reading. In a case where the print condition does not agree with the reading condition, the print condition is arranged (set) by selecting the "PRINT SETTING" in the main menu as illustrated in FIG. 5A. A procedure for such an arrangement is similar to that for the reading condition. When the "PRINT SETTING" is pressed, the print condition is designated and stored for the image data read. Herein, the print condition includes, for example, the resolution corresponding to a page, a sheet size, an enlargement or a reduction in scale, an N-UP layout in the course of printing, two-sided print, and multi-color or monochrome print. Such an arrangement can be provided with respect to each page or each group. The image data read is printed by such a stored print condition. In addition to the image data, a file stored in a mobile memory can be inserted into the MFP 100 of the embodiment of the present invention, so that the print condition can be arranged by selecting the "PRINT SETTING" in the main menu illustrated in FIG. 5A similarly to a method described above. The image forming mechanism can employ an inkjet method or an electrophotographic method.

Therefore, the MFP 100 can change the reading resolution with respect to each page designated by the operator according to the first embodiment. Consequently, the MFP 100 can read the image on the original document with the reading resolution appropriate for the multi-color image or the monochrome image, thereby reducing occurrences of eating the memory or prolonging a reading time of the image.

Second Embodiment

In a second embodiment, multi-functional peripheral (MFP) 200 serving as an image processing apparatus is explained. Since the MPF 200 is similar to the MFP 100 of the first embodiment, only elements and configurations of the MFP 200 that differ from those of the above embodiment will be described, and like elements will be given the same reference numerals as above and description thereof will be omitted. According to the second embodiment, a scanning main controller 4 administrates reading resolution information stored in a memory 7 and supplies an instruction with respect to an operation unit 5 to display the reading resolution information as history (historical) information. The operation unit 5 displays the reading resolution information and receives a selection of the reading resolution information to be used by an operator.

That is, the reading resolution information stored in the memory 7 in a past time is selectably displayed in a display unit 30 as the history information by the operation unit 5 according to the second embodiment. The operator selects the reading resolution information displayed on the display unit 30, thereby executing the designation of the reading resolution. Therefore, the operator does not need to execute a designation operation of the reading resolution and the like described above in the first embodiment with respect to each page. A detailed description of the MFP 200 is given below.

Referring to FIGS. 12A, 12B, 12C, 13A, and 13B, examples of display screens displayed on the display unit 30 according to the second embodiment are illustrated.

Figure 12A:
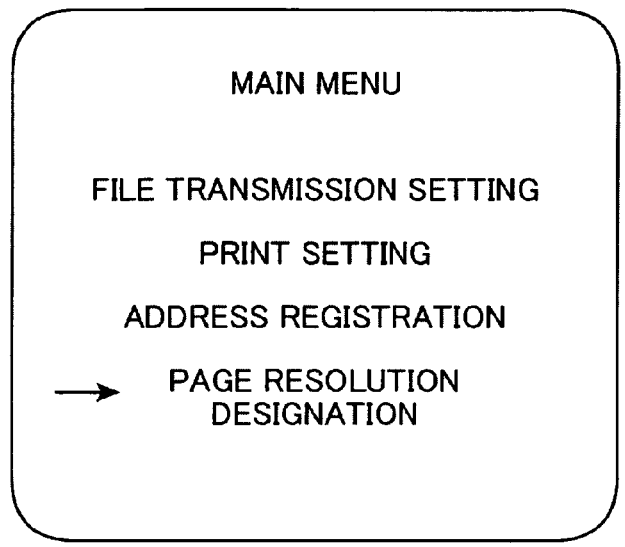
FIGS. 12A through 12C are schematic diagrams illustrating examples of display screens of the display unit according to a second embodiment of the present invention.

Since the display screen of FIG. 12A is substantially the same as that of the FIG. 5A of the first embodiment, a description thereof is omitted.

Figure 12B:
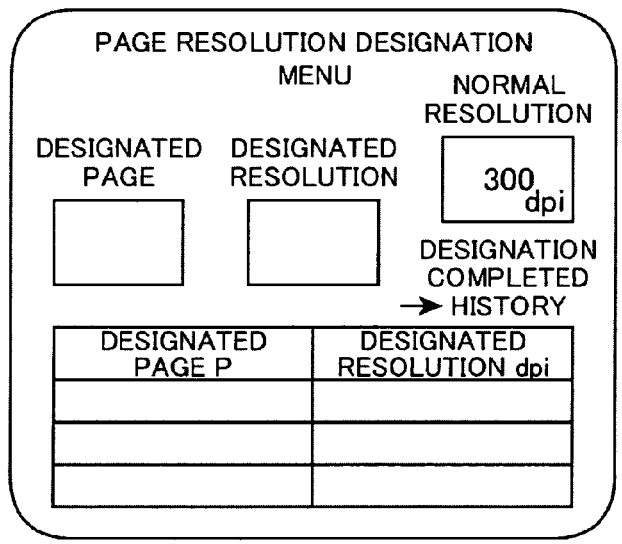

When the operator manipulates operation buttons 36, 38, 40, and 42 and selects "PAGE RESOLUTION DESIGNATION" on the display screen of FIG. 12A, the display screen of FIG. 12B is displayed. In a case where the operator uses the reading resolution information stored in the memory 7, an item "HISTORY" is selected.

Figure 12C:
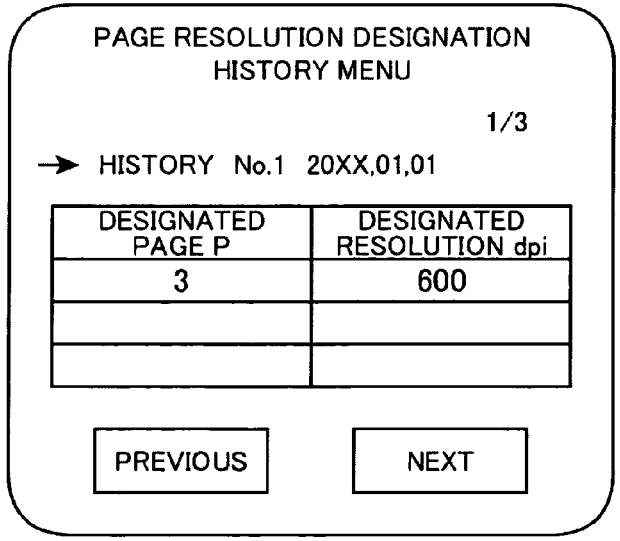

When the operator manipulates the operation buttons 36, 38, 40, and 42 and selects the item "HISTORY" on the display screen of FIG. 12B, the display screen of FIG. 12C is displayed. A file name of the reading resolution information and the designation information of the reading resolution and the like stored in the memory 7 are displayed on the display screen of FIG. 12C. According to the second embodiment, a save file name "20XX. 01.01" described in the first embodiment is displayed together with a content thereof by the operation unit 5.

In a case of sequentially displaying other reading resolution information stored in the memory 7, the operator moves an input cursor to a "PREVIOUS" button or a "NEXT" button using the operation buttons 36, 38, 40, and 42 (e.g., FIG. 13A). Therefore, the operator sequentially displays other reading resolution information stored in the memory 7 by using the "PREVIOUS" button or "NEXT" button. For example, a save file name "20XX. 02.01" is displayed as history information No. 2 as illustrated in FIG. 13B.

Figure 14:
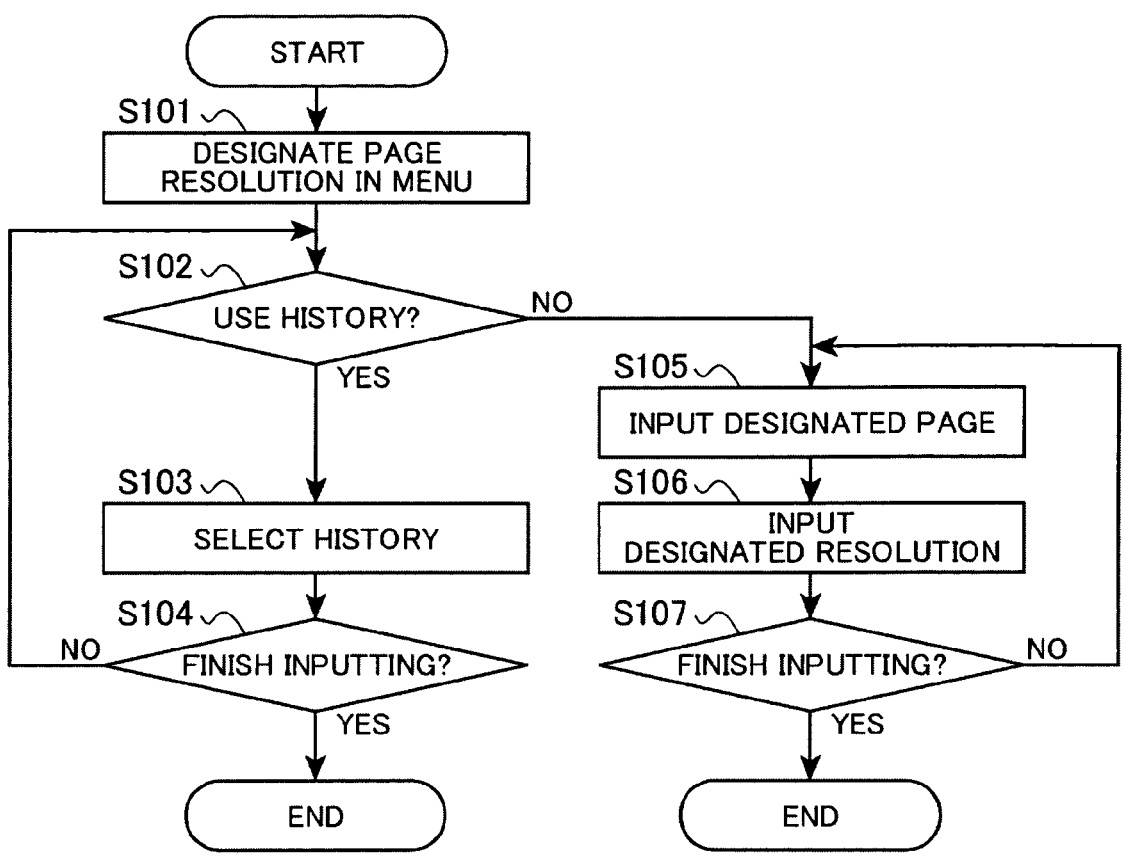
FIG. 14 is a flowchart illustrating an exemplary procedure for designation operation in a case of the reading resolution is designated according to the second embodiment of the present invention.

Referring now to a flowchart of FIG. 14, an exemplary procedure for operating the designation in a case where the operator designates the reading resolution by using the above described display screens is explained.

When the operator selects "PAGE RESOLUTION DESIGNATION" on the display screen of FIG. 12A, the display screen of FIG. 12B is displayed, so that the operator designates the reading resolution. Particularly, the operator inputs 300 dpi as normal resolution in a normal resolution box 51 using operation buttons 34 through 43, and presses an operation button 32 (step S101).

Next, in a case where the reading resolution information stored in the memory 7 is used (Yes in step S102), the operator moves the input cursor to "HISTORY" using any of the operation buttons 36, 38, 40, and 42, and presses the operation button 32. Upon receiving a usage of the history information, the operation unit 5 notifies the scanning main controller 4 of the reading resolution information stored in the memory 7 to be used by the operator. Upon receiving the notification that the operator uses the reading resolution information stored in the memory 7, the scanning main controller 4 supplies the instruction with respect to the resolution designation controller 6 to read the reading resolution information stored in the memory 7. The reading resolution information read by the resolution designation controller 6 is transmitted to the operation unit 5 through the scanning main controller 4. Accordingly, the scanning main controller 4 supplies the instruction with respect to the operation unit 5 to display the display screen of FIG. 12C.

In a case where plural units of reading resolution information are stored in the memory 7, the operator causes desired reading resolution information to be displayed by pressing the "PREVIOUS" button or the "NEXT" button on the display screen of FIG. 13A. In a case of selecting the reading resolution information, the operator presses the operation button 32 in a state that the reading resolution information to be used is being displayed on the display screen (step S103). Upon receiving a selection decision of the reading resolution information, the operation unit 5 notifies the scanning main controller 4 of the reading resolution information selected by the operator. The scanning main controller 4 controls a reading controller 3 based on the reading resolution information selected by the operator. The reading controller 3 controls a reading unit 13 for ADF based on the designation information of the reading resolution.

In a case of finishing the selection of the reading resolution information (Yes in step S104), the operator moves the input cursor to "DESIGNATION COMPLETED" as illustrated in FIG. 12B and presses the operation button 32. Hereupon, the scanning main controller 4 finishes displaying the screen of FIG. 12B and supplies the instruction to the operation unit 5 to display the display screen of FIG. 12A serving as a standby screen.

On the other hand, in a case where the operator does not use the reading resolution information (No in step S102), the operator executes designation operation of the reading resolution (step S105 through step S107) similarly to step S2 through step S4 of FIG. 7 described above with respect to the first embodiment.

Similar to the MFP 100 of the first embodiment, the MFP 200 of the second embodiment executes the reading operation by receiving the above-described designation operation of the reading resolution by the operator.

After the reading operation by the reading unit 13 for ADF is finished, the image data in the table format stored in the memory 7 can by transmitted to a prescribed address, or the image data can be stored in a mobile memory to be carried.

Moreover, the image data read can be printed by a printer 9 serving as an image forming mechanism as illustrated in FIG. 1. In a case where such image data is printed using a normal default setting, a print condition may agree or may not agree with the reading condition at a time of reading. In a case where the print condition does not agree with the reading condition, the print condition is arranged by selecting the "PRINT SETTING" in the main menu as illustrated in FIG. 12A. A procedure for such an arrangement is similar to that for the reading condition. When the "PRINT SETTING" is pressed, the print condition is designated and stored for the image data read. Herein, the print condition includes, for example, resolution corresponding to a page, sheet size, enlargement (enlargement ratio) or reduction (reduction ratio) in scale, N-UP layout in the course of printing, whether the image data is printed in a two-sided format, and multi-color or monochrome print. Such an arrangement can be provided with respect to each page or each group. The image data read is printed by such a stored print condition. In addition to the image data, a file stored in a mobile memory can be inserted into the MFP 200 of the embodiment of the present invention, so that the print condition can be arranged by selecting the "PRINT SETTING" in the main menu illustrated in FIG. 12A similarly to a method described above. The image forming mechanism can be independent. The image forming mechanism can employ an inkjet method or an electrophotographic method.

In the MFP 200 according to the second embodiment described above, the operator can use the reading resolution information stored in the memory 7. Therefore, the MFP 200 of the second embodiment can save labor of the operator for designating the reading resolution in addition to an advantage described in the first embodiment.

According to the embodiment, the resolution at which to read the original document is arranged as an example. However, other parameters relating to reading, the reading condition, may be arranged in addition to the resolution. The parameters include, for example, reduction ratio in a case of reading by reduction, enlargement ratio in a case of reading by enlargement, layout in a case of reading (e.g., what pages are to be arranged in an N-UP layout), two-sided format (what pages to be read in a two-sided format), and multi-color or monochrome reading. According to the embodiment, the arrangement is made with respect to each page. However, the designation may be made with respect to each group. For example, the reading parameters relating to eight pages from a first page to an eighth page may be arranged collectively (e.g., the reading resolution of all of eight pages is 600 dpi). Moreover, the history in the second embodiment may be applied to the reading condition described above.

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image processing apparatus, comprising:
    a reading unit generating image data by reading a plurality of original documents;
    a first designation unit designating a first reading condition as a reading condition for a portion of the plurality of original documents to be read by the reading unit;
    a first storage unit storing information on the reading condition for said portion of the plurality of original documents as first reading condition information; and
    a reading control unit reading the first reading condition information and controlling the reading unit based on the first reading condition information read,
    wherein the first storage unit stores as historical information second reading condition information on a second reading condition previously designated by the first designation unit, and
    wherein the first designation unit reads out the historical information from the first storage unit to designate, based on the historical information read, the second reading condition as the reading condition for said portion of the plurality of original documents.

2. The image processing apparatus according to claim 1, further comprising an original document conveyance unit separately conveying the plurality of original documents one by one.

3. The image processing apparatus according to claim 1, further comprising an image forming unit forming an image on a medium based on the image data generated by the reading unit.

4. The image processing apparatus according to claim 3, further comprising:
    a second designation unit designating an image forming condition as an image forming condition for a portion of the image data, when the image is formed with respect to the portion of the image data;
    a second storage unit storing information on the image forming condition for the portion of the image data as image forming condition information, and
    an image forming control unit reading the stored image forming condition information and controlling the image forming unit based on the image forming condition information read.

5. The image processing apparatus according to claim 1, wherein the reading condition for said portion of the plurality of original documents is a parameter that is set for reading said portion of the plurality of original documents and that is at least one of resolution, reduction ratio, enlargement ratio, a range of pages with an N-UP layout, a range of pages to be read in a two-sided format, and whether said portion of the plurality of original documents is read as a color image or as a monochrome image.

6. The image processing apparatus according to claim 4, wherein the image forming condition is a condition of at least one of resolution, reduction ratio, enlargement ratio, N-UP layout, whether the formed image is in a two-sided format, and whether the formed image is a color image or is a monochrome image.

7. The image processing apparatus according to claim 1, wherein
the first storage unit stores as the historical information on a plurality of reading conditions previously designated by the first designation unit, and
the first designation unit reads out the historical information from the first storage unit to selectively designate, based on the historical information read, one of the plurality of reading conditions as the reading condition for said portion of the plurality of original documents.

8. The image processing apparatus according to claim 1, further comprising an operation unit inputting third reading condition information on a third reading condition,
wherein the first designation unit selectively designates, as the reading condition for said portion of the plurality of original documents, one of the third reading condition based on the inputted third reading condition information and the second reading condition based on the historical information read.

* * * * *